(12) United States Patent
Hendry

(10) Patent No.: US 6,855,280 B2
(45) Date of Patent: Feb. 15, 2005

(54) METHOD FOR INJECTION MOLDING OF PLASTIC MATERIALS USING GAS HOLDING PRESSURE IN MOLD

(75) Inventor: James W. Hendry, Brooksville, FL (US)

(73) Assignee: Lear Corporation, Southfield, MI (US)

(*) Notice: Subject to any disclaimer, the term of this patent is extended or adjusted under 35 U.S.C. 154(b) by 11 days.

(21) Appl. No.: 10/306,118

(22) Filed: Nov. 27, 2002

(65) Prior Publication Data

US 2004/0099978 A1 May 27, 2004

(51) Int. Cl.[7] .............................................. B29D 22/00
(52) U.S. Cl. ...................................... 264/40.3; 264/572
(58) Field of Search ............................... 264/40.3, 572; 425/130, 146, 556

(56) References Cited

U.S. PATENT DOCUMENTS 5,558,824 A * 9/1996 Shah et al. ................. 264/40.3
6,019,918 A * 2/2000 Guergov ..................... 264/40.3

* cited by examiner

Primary Examiner—Suzanne E. McDowell
(74) Attorney, Agent, or Firm—Bill Panagos (57) ABSTRACT

A system and process for gas-assisted injection molding of plastic materials using gas holding pressure in the mold cavity. An infinitely controlled gas pressure valve is utilized to provide initial pressure in a sealed mold and the gas is vented to a prespecified pressure when plastic is injected into the mold cavity. Additional gas is injected into the plastic material from a gas pin assembly in order to force the plastic to completely fill the mold cavity and to provide a hollow cavity in the completed part. Once the injection molding process has been completed and the part has cooled and solidified, the mold is opened, and the completed plastic molded component or part is removed or ejected.

11 Claims, 7 Drawing Sheets

METHOD FOR INJECTION MOLDING OF PLASTIC MATERIALS USING GAS HOLDING PRESSURE IN MOLD

TECHNICAL FIELD

The present invention relates to plastic injection molding systems and more particularly to gas-assisted plastic injection molding systems and processes.

BACKGROUND OF THE INVENTION

There are numerous known systems for plastic injection molding. In conventional plastic injection molding systems, plastic pellets are melted in an injection molding machine and advanced by a screw ram into a mold cavity. The mold cavity is formed between two mold halves (a core member and a cavity member), typically through one or more sprue bushings, a manifold and/or a hot runner system. The two halves of the mold are clamped, typically under high pressure, and the plastic is injected into the mold cavity, again under significant pressure in most instances. The molten plastic material in the cavity is allowed to cool and harden in the cavity, typically by a cooling system which circulates a cooling fluid through one or more of the mold members. When the part has sufficiently hardened, the mold is opened and the part is removed, typically by one or more ejector pins.

Some of the known systems utilize a gas in the injection molding process and are commonly known as "gas-assisted injection molding" systems. In these systems, the gas is injected into the molten plastic material through the plastic injection nozzle itself, or through ;one or more pin mechanisms strategically positioned in the mold, sprue bushings, manifold or hot runner systems. It is also possible to inject the gas directly into the molten plastic in the barrel of the injection molding machine. The gas, which typically is an inert gas such as nitrogen, is injected under pressure and forms one or more hollow cavities or channels in the molded part. The benefits of gas-assisted injection molding processes are well-known, and include the cost savings through the use of less plastic material, producing parts which are lighter in weight, and producing parts which have better surface definitions and finishes.

Another plastic injection molding system which utilizes gas injects the gas into the mold cavity along one or more exterior surfaces of the molded part. The pressurized gas forces the plastic against the opposite surface or surfaces of the mold cavity and forms a part with superior surface characteristics on the appearance surfaces.

One particular gas-assisted injection molding system utilizes a connecting spill-over cavity coupled to the mold cavity. Such system is shown, for example, in U.S. Pat. No. 5,098,637. In this system, a portion of the plastic from the mold cavity is displaced into the spill-over cavity when the charge of pressurized gas is introduced. This process has particular use for door and grip handles.

Although many of these gas-assisted injection molding systems operate satisfactorily and have produced commercially acceptable plastic injection molded parts and components, there is a need for improved systems and processes, and particularly those which do not utilize spill-over cavities.

SUMMARY OF THE INVENTION

It is an object of the present invention to provide an improved "gas-assisted injection molding" system and process. It is another object of the present invention to provide an improved gas-assisted injection molding process and system for making plastic parts and components in which a spill-over cavity is not utilized or required.

It is another object of the present invention to provide a gas-assisted injection molding system and process in which the amount of plastic material injected into the mold and the pressures of the injected gas are controlled. It is a still further object of the present invention to provide a gas-assisted injection molding system and process in which the gas pressures in the mold are controlled in certain manners in order to provide a satisfactory product in an improved and beneficial manner.

In accordance with the present invention, a sealed mold is utilized, the plastic is injected from a standard injection molding machine, and the gas is injected into the mold either through the machine nozzle or through one or more gas pin assemblies. The mold is initially pressurized by the same or a separate gas source to a prespecified pressure. An infinitely pressure-controlled valve is utilized to control the pressure of gas in the mold. The plastic material is injected into the mold until a preselected pressure level is reached at which time the gas pressure valve holds the gas pressure constant. Alternatively, the gas pressure valve can allow the gas pressure to decay in a controlled manner At a preset distance of travel of the screw ram in the injection molding machine, a gas is injected through the gas pin assembly or assemblies. Alternatively, as the initial gas pressure is increased by the introduction of the plastic material and reaches a pre-selected level, the gas can be injected through the gas pin assembly or assemblies. The remaining portion of the plastic needed to make the molded part is also injected into the cavity.

Once the plastic has been injected, the electrically controlled gas pressure valve will reduce the pressure in order to allow the plastic to fill the extremities of the cavity. Also, gas injection pressure through the gas pin assembly or assemblies will assist in deploying the plastic and regulating the final gas pressure.

Once the plastic product has cooled, gas is vented from the mold, the mold is opened, and the part is removed from the mold. Preferably, one or more ejector pins are utilized to assist in removing the part from the mold.

Other embodiments, benefits, and features of the present invention will become apparent from the following description of the invention when viewed in accordance with the accompanying drawings and appended claims.

DESCRIPTION OF THE PREFERRED EMBODIMENT(S)

A preferred embodiment of the present invention is shown in FIGS. 1–5 and indicated generally by the reference numeral 10. These figures show both a unique and inventive system for gas-assisted injection molding as well as illustrating a unique and inventive process for gas-assisted injection molding.

Figure 1:
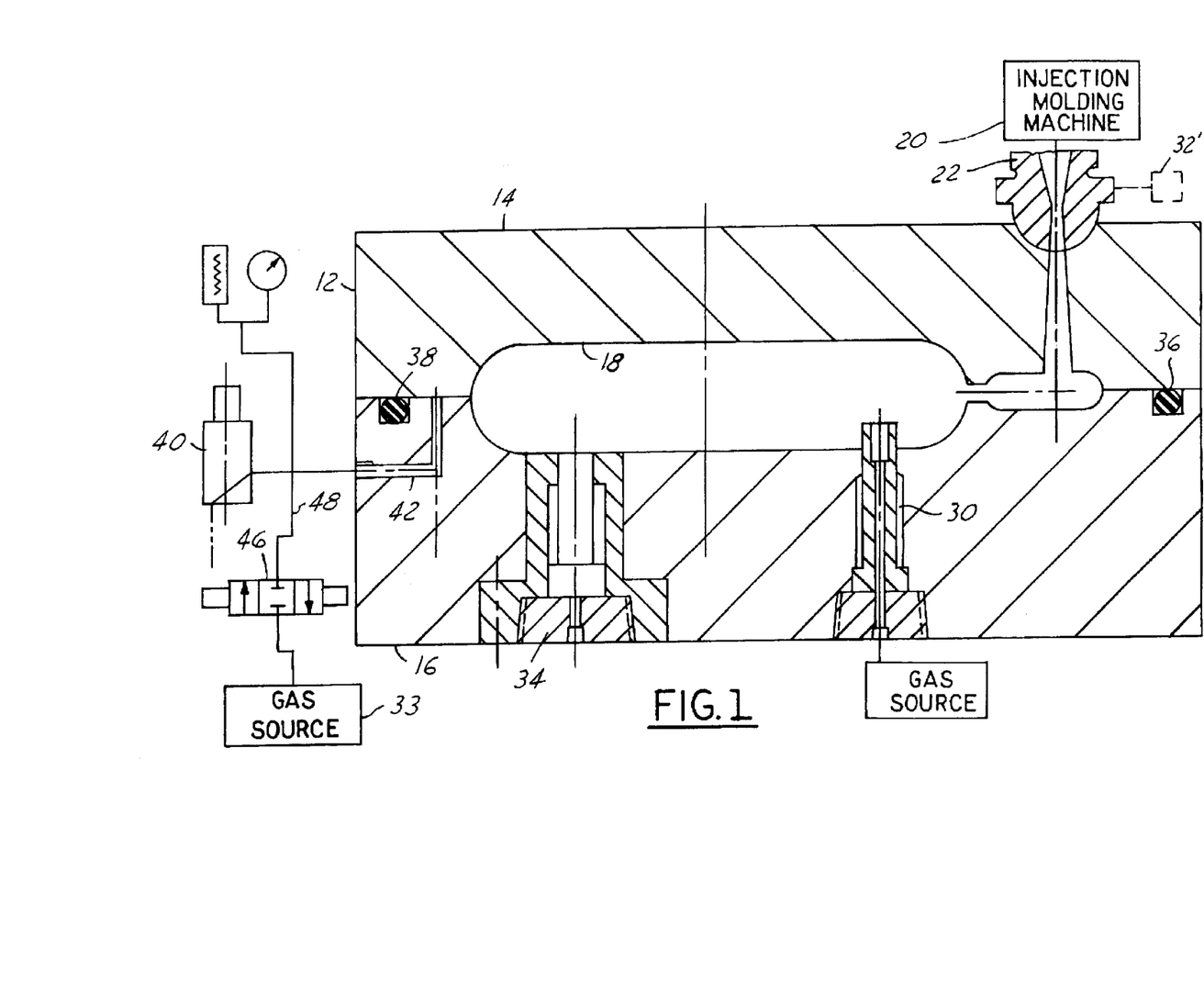
FIG. 1 is a schematic illustration of a preferred embodiment of the present invention.

The embodiment 10 includes a mold 12 which includes a first upper mold member 14 and a second or lower mold member 16. A cavity 18 is formed in the mold 12 and is formed or machined in the precise shape of the final plastic component or part to be manufactured. An injection molding machine 20 is positioned adjacent the mold 12 and includes a nozzle member 22 which is pressed in contact with the mold 12. In accordance with conventional injection molding processes, molten plastic melted in the injection molding machine is injected through the nozzle 22 and into the mold cavity 18 in the mold 12.

Also in accordance with the preferred embodiment 10, pressurized gas, such as nitrogen, is injected into the mold cavity 18 through one or more gas pin assemblies 30. The gas is inserted through the gas assembly 30 from a gas source 32.

Also in the embodiment 10, one or more pneumatic or hydraulic ejector pin assemblies 34 are provided. As with conventional injection molding processes, the ejector pin assemblies are utilized to force or eject the molded part from the mold cavity once the part has been formed and hardened.

In accordance with the present invention, the mold 12 is sealed. This is shown schematically by the presence of seals 36 and 38 which are positioned in grooves between the two mold members 14 and 16. It is understood, of course, that the mold cavity can be sealed in any conventional manner and that the use of O-rings as described is only one way to accomplish this. Any other conventional mechanisms or means for sealing a mold cavity can be utilized in accordance with the knowledge of persons of ordinary skill in the art.

An electrically controlled gas pressure valve 40 is connected to conduit 42 and used to control the pressure of the gas in the mold cavity 18. The gas pressure valve 40 is infinitely pressure controlled and can be of any conventional type, such as a Tescom servovalve.

A directional valve 46 is also provided and in communication with conduit 42 and the mold cavity 18 through conduit 48. A gas source 33 is also connected through the valve 46 to the conduit 42 and thus to the mold cavity 18. This allows pressurization of the mold cavity as desired and in accordance with the present invention. In this regard, the gas sources 32 and 33 can be separate, as shown, or comprise the same gas source as desired. If the same gas source is utilized, then pressure regulators and the like would have to be utilized in order to allow gas to be directed to the gas pin assemblies 30 and through the valve 46 in different amounts and at different times as required by the present invention.

It is to be understood that any type of sealed mold member can be utilized in accordance with the present invention. The particular mold 12 shown in FIG. 1 is only illustrative of the various molds that can be utilized in accordance with the present invention. Similarly, any type of gas pin assembly or assemblies 30, ejector pin assembly or assemblies 34, vent valve mechanism 46, injection molding machine 20, and machine nozzle 22 can be utilized, so long as the objectives and purposes of the present invention are met. Different components of this type are within the skill of persons of ordinary skill in the art. Also, any conventional type of gas source or sources can be utilized.

Although the gas to be introduced into the mold cavity 18 is shown to be injected through gas assembly or assemblies 30, it is understood that the gas for the gas-assisted injection molding process can also be provided through any other conventional manner, such as in the machine nozzle 22. This is shown in hidden lines by gas source 32' in FIG. 1. Also, it is to be understood that any number of gas pin assemblies can be utilized with the present invention. The type of gas pin assembly and the number of assemblies utilized depend on the size and configuration of the mold cavity 18 and the resulting part or component to be produced.

Figure 2:
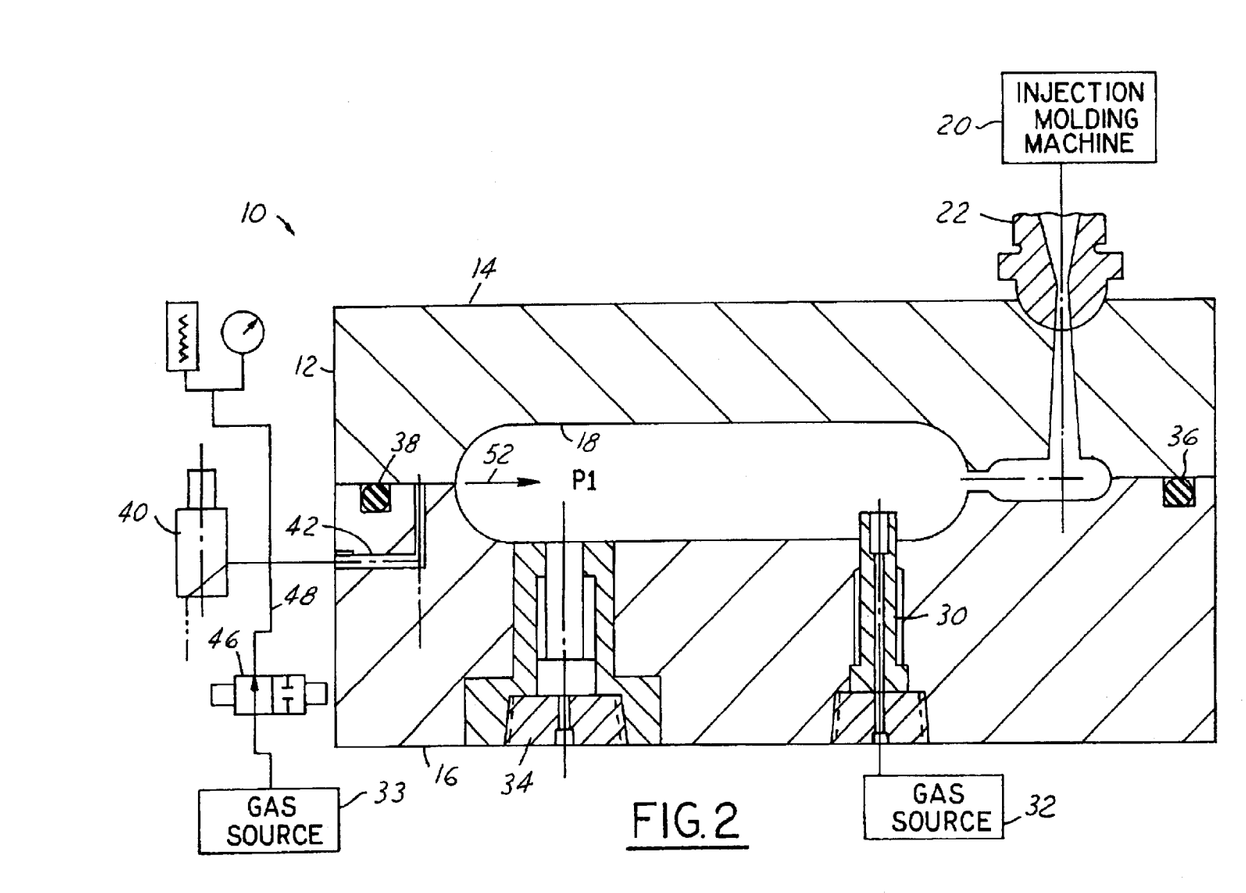
FIGS. 2–5 depict various steps in the process in accordance with the present invention.

FIGS. 2 through 5 illustrate a preferred process in accordance with the present invention. As shown in FIG. 2, the mold 10 is first closed and clamped together in a conventional manner. The seals 36, 38 provide a sealed mold so that pressure cannot escape from it. Initially, the pressure in the mold is energized to a pressure of P1. This pressure is a pre-established pressure setting on the gas pressure valve 40. Gas from gas source 33 is injected through the valve 46, conduit 48 and conduit 42 into the mold cavity 18. This is shown by arrow 52. The value of pressure P1 is preestablished by the parameters of the injection molding process, including factors such as the amount of material to be utilized, the size of the part and the melt index.

Figure 3:
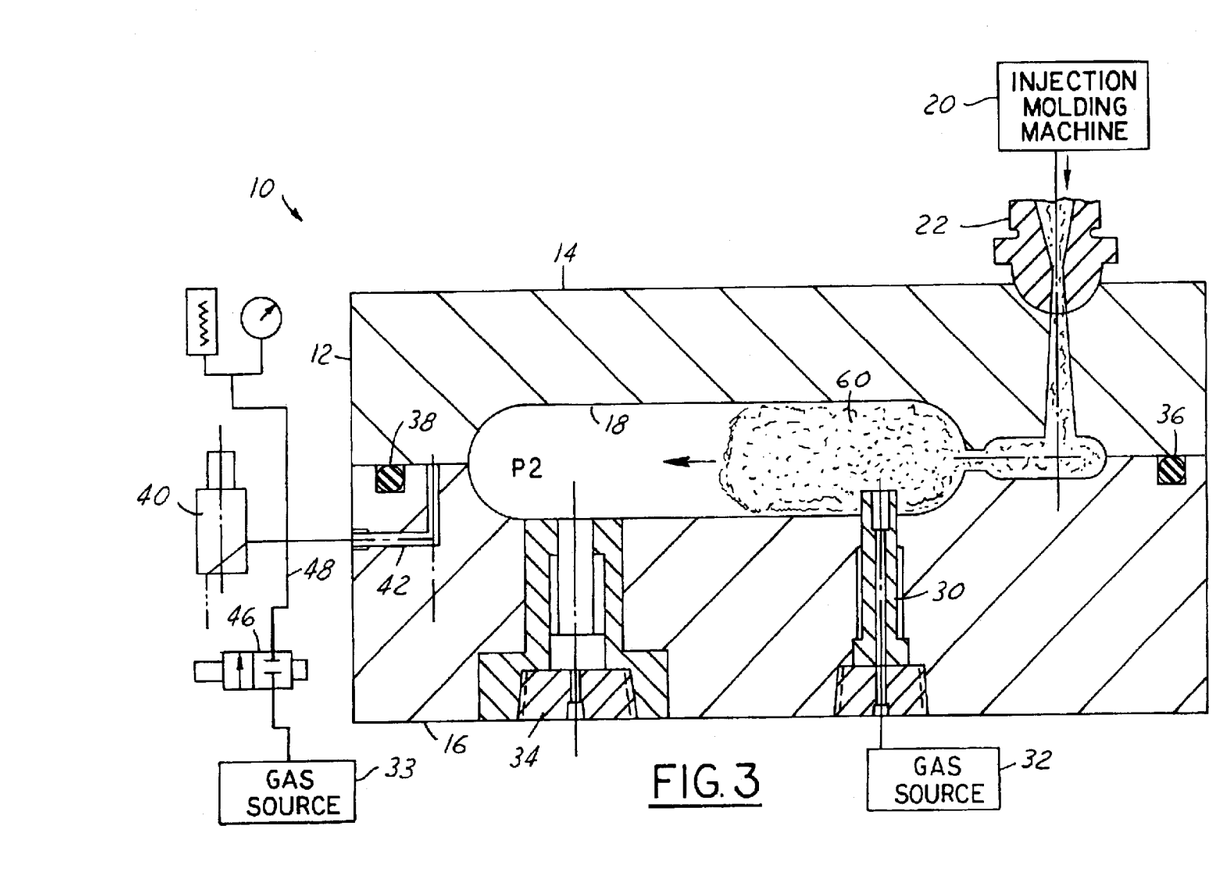

Thereafter, as shown in FIG. 3, the injection of plastic material into the mold cavity 18 is initiated. The plastic material is supplied by the injection molding machine 20 through the nozzle 22 and into the mold cavity. In FIG. 3, the plastic material is generally indicated by the reference numeral 60.

As the plastic is introduced into the mold cavity and occupies some of its volume, the gas pressure in the mold and at the gas pressure valve 40 will increase to a pressure P2. Also, the plastic injection pressure will increase.

When the injected pressure has compressed the pre-charged gas pressure P1 to the maximum pre-selected pressure as set in gas pressure valve 40, any excess pressure will vent through pressure valve 40. In this manner, the pressure is held constant in the mold cavity from this point on. For example, if the initial pressure of P1 in the mold cavity is 300 psi, and the desired pressure is 600 psi, the pressure of P2 will reach 600 psi when the mold cavity 18 is fifty percent (50%) filled with the plastic material 60.

Figure 4:
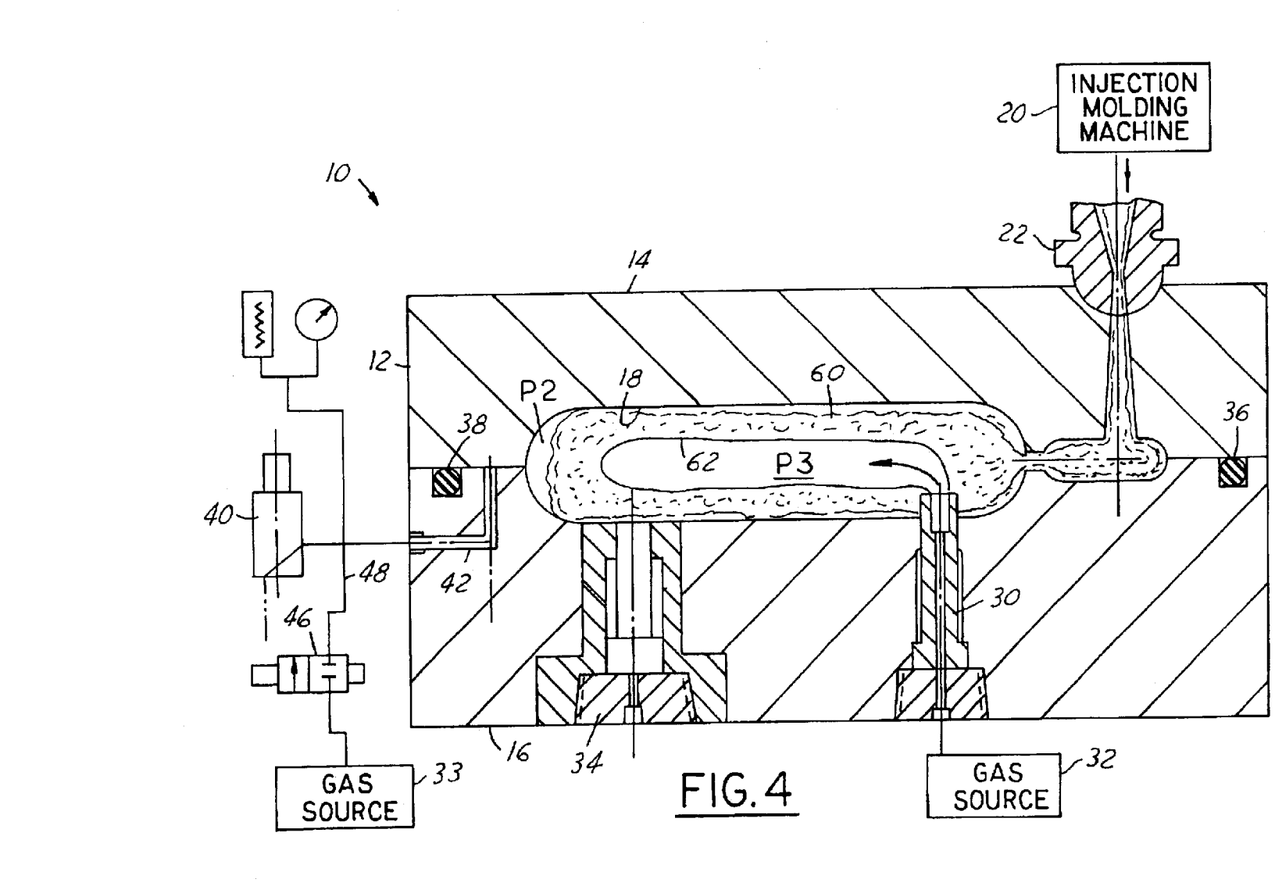

At a preset distance of travel of the screw ram in the injection molding machine 20, or when the initial gas pressure reaches a pre-selected level, the gas pin assembly or assemblies 30 will start injecting gas into the plastic material. This is shown in FIG. 4. A pressure switch is used to initiate the flow of this gas. As the gas is injected through the pin assembly 30 into the plastic material 60, the gas forces the plastic material into all of the portions of the mold and forms a hollow cavity 62 in the material. The pressure of the gas from the gas source 32 and the pin assemblies or assembly 30 is indicated by pressure P3 in FIG. 4. The gas injection pressure P3 will be either slightly more or less than the maximum pressure setting of the electrically controlled gas pressure valve 40. Thereafter, the remaining plastic material 60 is continued to be injected into the mold cavity 18 sufficient to make the completed molding component or part. For example, if a weight reduction of 20 percent is desired, than 80 percent of the plastic by volume will be required. The pin assembly or assemblies 30 will preferably begin injecting gas into the plastic material when 90–98% (and preferably 95–98%) of the plastic material has been injected into the mold cavity.

The distance of travel of the screw ram can be measured or determined in any conventional manner, such as linear transducer (LTD) or a limit switch. The back or "contra" gas pressure in the mold cavity prevents the plastic material from "jetting" into the cavity. Instead, the plastic material flows into the mold cavity essentially as a "plug" with a relatively constant cross-section and leading front surface.

Figure 5:
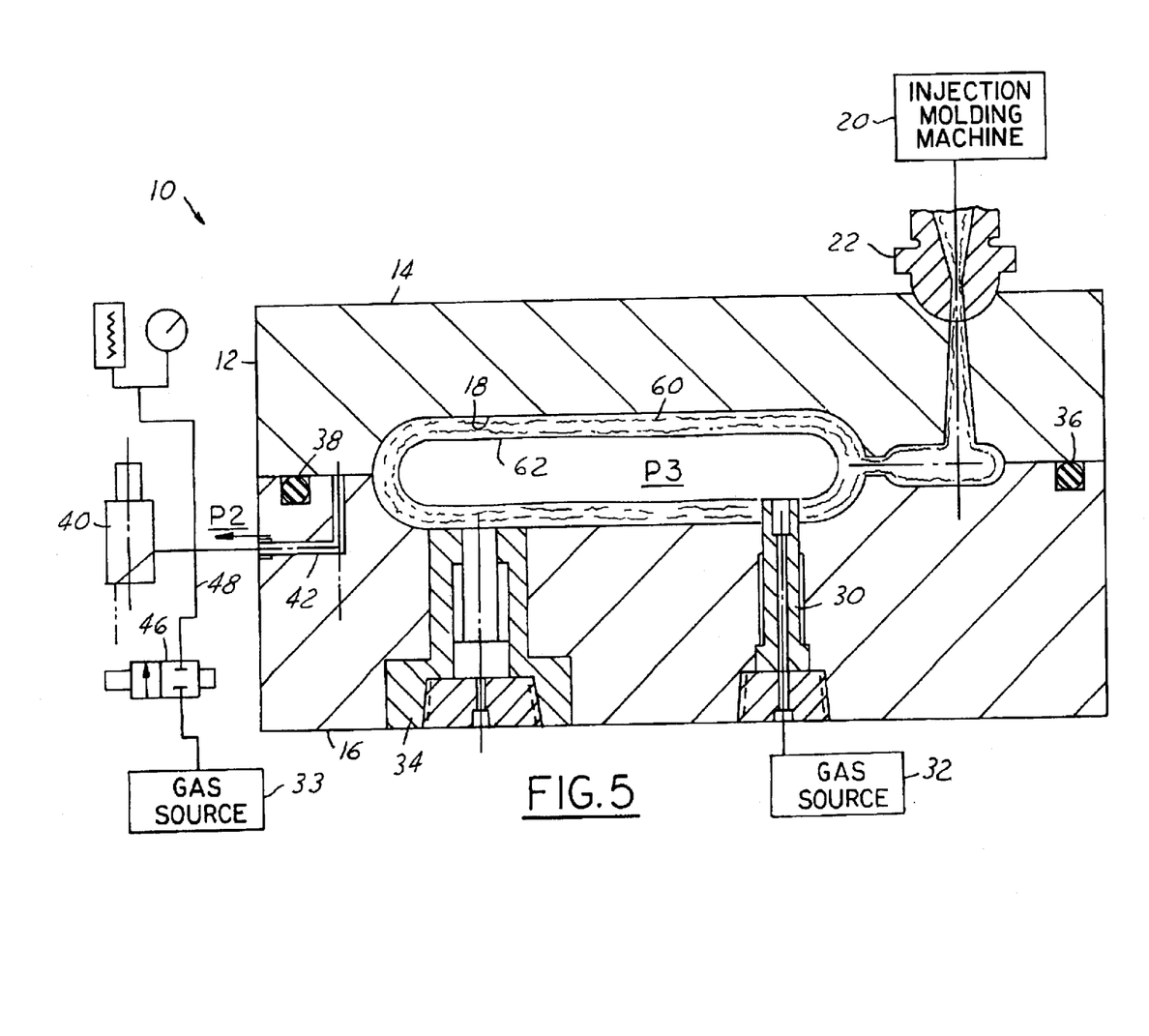

At the stage of the plastic injection process where 90–98% by volume of the plastic is injected into the mold cavity, the valve 40 will begin venting the predetermined maximum gas pressure of P2. The venting will take place at a controlled rate and pressure. This is shown in FIG. 5. As the gas injection pressure from the gas pin assembly or assemblies 30 continues, the plastic material is forced throughout the extremities and extent of the mold cavity 18. At the same time, the flow of the plastic material will force the gas holding pressure P2 out through the valve 40.

Thereafter, the pressure P3 in the mold will be held constant until the plastic material 60 is solidified and cooled sufficient to make the component or part self-supporting. At that point, the mold 12 will be opened and the plastic part or component ejected. The gas pin assembly 34 or plurality of gas pin ejector assemblies 34 will then be activated in a conventional manner to eject the completed part from the mold cavity. These latter steps are all conventional and can be accomplished in accordance with standard injection molding procedures, mechanisms, and processes.

When the molded part has cooled and solidified, the gas pressure P3 in the hollow cavity in the molded part is removed or released through the gas pin assembly or assemblies 30. Thereafter, the mold is opened and the part ejected in a conventional fashion.

The difference in pressures between P2 and P3, acting against each other, eliminates blow out of plastic in the mold and allows the plastic to keep moving in the mold cavity throughout the total injection phase. This prevents hesitation marks and helps provide a better finish on the final component or part. Hesitation marks are typically caused by the surging (stopping and starting) of the plastic material in the mold during molding.

The gas used to fill the mold, as represented by pressures P1 and P2, can be recycled. This can be done in any conventional manner as known to persons of ordinary skill in the art. The recycling of gas helps make the process more efficient and less expensive.

As indicated above, the representation of gas pin assembly 30 is only schematic and symbolic. Any known gas pin can be utilized in accordance with the present invention. In the drawings, the gas pin is depicted protruding into the mold cavity, but this is not required and is just one option.

Also, as indicated above, the gas pin assembly or assemblies 30 can be replaced by introducing gas through the machine nozzle 22, as shown by reference numeral 32' in FIG. 1. If gas is introduced through the nozzle 22, then a sprue brake is utilized in order to vent the gas from the molded part prior to opening of the mold and ejection of the part.

In accordance with an alternate embodiment, a vacuum can be drawn in the mold cavity 18 prior to pressurization with gas in order to remove any air in the mold. Also, the machine nozzle 22 is preferably sealed or provided with a gas-tight seal against the mold 12 in order to allow the present inventive process to be more efficient.

Also, the ejector pin assembly or assemblies 34 are sealed to prevent gas leakage. Preferably, O-rings and the like are positioned around each ejector pin for this purpose. Other sealing systems or mechanisms known to persons of ordinary skill in the art can also be utilized to seal the ejector pin assemblies to prevent leakage of gas.

Figure 8:
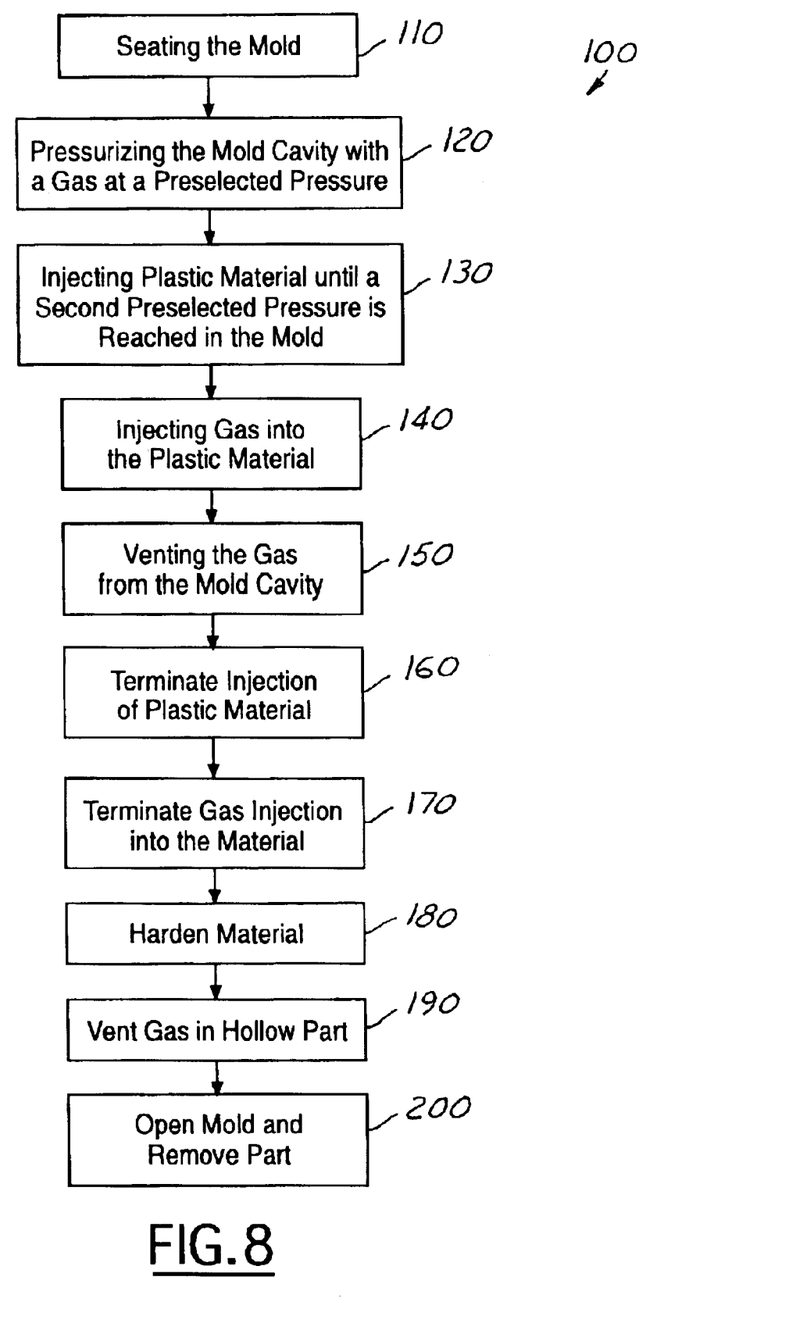
FIG. 8 is a flow chart depicting the elements of the inventive process.

A preferred method for use in the present invention is shown in the flowchart in FIG. 8. The method is referred to generally by reference number 100 and starts with the step of sealing the mold 110. After the mold is sealed, the mold cavity is pressurized with a gas at a preselected pressure. This is step 120. A plastic material is then injected into the mold cavity until a second pre-selected pressure is reached in the mold cavity. This is shown by step 130.

Gas is then injected internally into the plastic material. This is step 140. Thereafter, the pressurized gas from the mold cavity which is applying a contra or back pressure force against the plastic material in the mold cavity is vented, preferably at a controlled rate. This is shown in step 150. The injection of the plastic material and the injection of the gas into the plastic material are continued at this point. Thereafter, injection of the plastic material into the mold cavity is terminated. This is step 160. Subsequently, the gas which is being injected into the plastic material is terminated. This is step 170. The gas flow is continued into the plastic material until the entire mold cavity is full and the molding process is complete.

The gas pressure is then held constant in the plastic material until the plastic material is cooled and hardened. This is shown in step 180. Thereafter, the internal gas in the hollow plastic article is vented. This is step 190. Finally, the mold is opened and the completed molded part is removed. This is step 200. Typically, injection pins are utilized in order to assist in the removal of the molded part from the mold cavity.

Figures 6, 7:
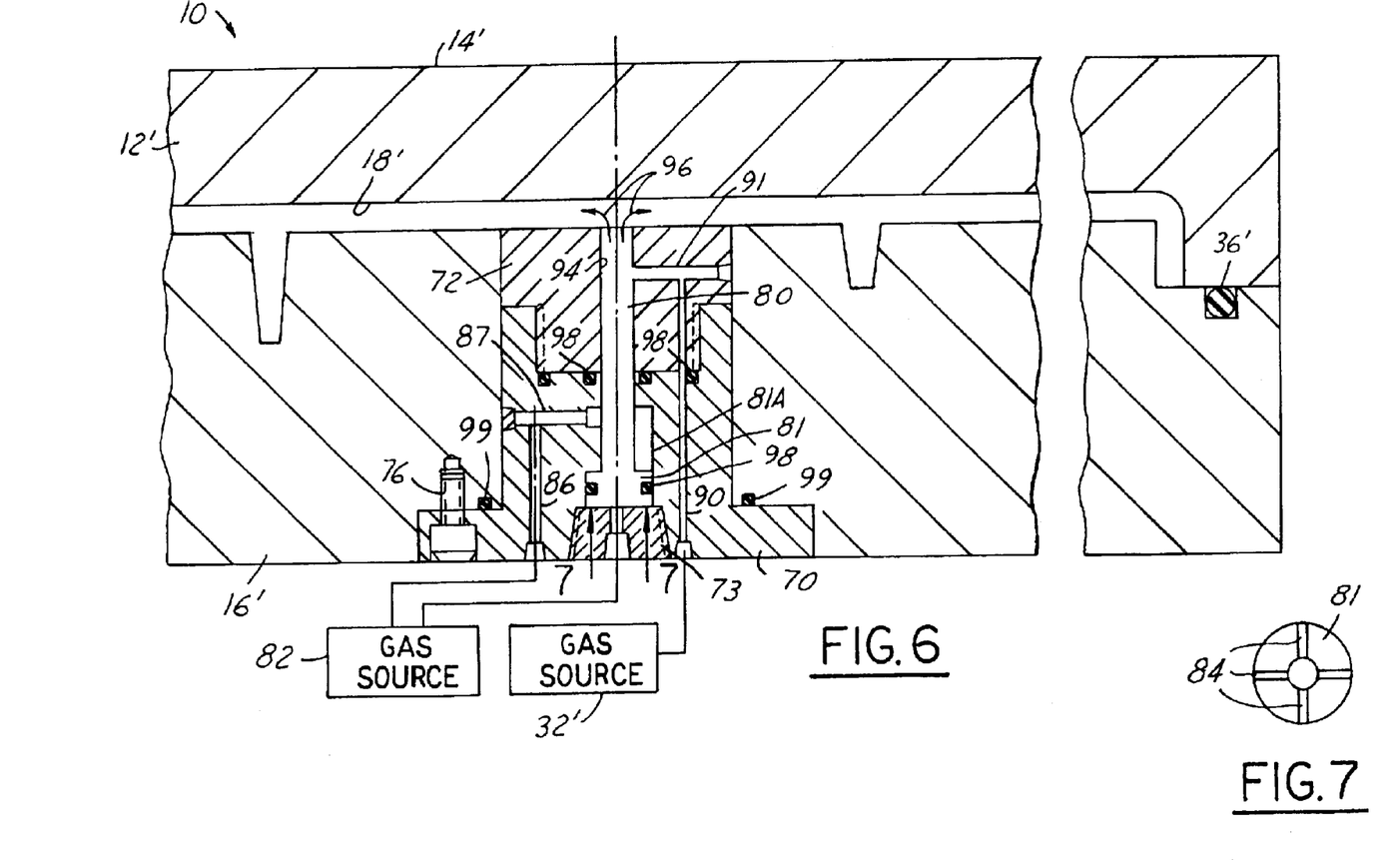
FIG. 6 illustrates a combined gas entry and ejector pin assembly which can be utilized with the present invention.
FIG. 7 is a cross-sectional view taken along line 7—7 in FIG. 6 and in the direction of the arrows.

In another alternate embodiment, a combined gas entry and ejector pin mechanism can be utilized. Such a mechanism is shown in FIG. 6 and referred to generally by the reference numeral 70. The mechanism 70 includes an upper member 72 and a base member 74. The base 74 is connected to the lower mold member 16' by a plurality of fasteners, such as bolts 76.

The combined gas entry and ejector pin mechanism 70 is positioned in the lower mold portion 16' of a mold 12' which also contains an upper member 14'. A mold cavity 18' in which the plastic is to be injected is supplied' between the two mold halves 14' and 16'. Also, in accordance with the present invention, the mold cavity 18' is sealed, such as by O-ring members 36'.

A removable rod or ejector pin member 80 is positioned in the mechanism 70 and adapted to be activated by gas from gas source 82 to be injected or forced into the mold cavity 18' and thus eject the completed molded plastic component or part from the mold cavity 18'.

As shown in cross-section 7—7 in FIG. 7, a plurality of grooves or slots 84 are provided in the base 81 of the pin member 80 in order to allow the gas to pass through the abutting surfaces.

Conduit 86 is also provided in the gas entry ejector pin mechanism 70 in order to allow gas from gas source 82 to return the ejector pin to its initial or rest position. Gas flows through conduits 86 and 87 and acts against the surface 81A of the base 81 of the pin member 80 in order to return it to its initial position.

A plug member 73 is positioned in the mechanism 70 in order to hold the ejector pin member 80 in place.

In order to supply gas into the mold cavity 18' during the gas-assisted injection molding process, gas from gas source 32' is supplied through conduits 90 and 91. The pressurized gas will enter the mold cavity 18' through the clearance or space between the ejector pin member 80 and the passageway or bore 94 in the member or mechanism 70 in which the ejector pin 80 is positioned. This is shown by arrows 96.

A plurality of seals 98 and 99 are provided in and around the member 70 in order to seal it from gas leaks. Seals 98 are preferably O-ring seals with anti-rollover features.

The embodiment of gas entry ejector pin mechanism 70 eliminates the need to seal the entire ejector pin assembly or assemblies 34 and saves gas. It also eliminates the ejector frame and saves material and components. It also will reduce the mold height and assures a gas-tight mold.

In still another alternate embodiment, pressurized water can be used to form the cavity in the injected plastic material in place of gas. For this purpose, a water pin assembly or assemblies is used in the place of the gas pin assembly or assemblies 30 described above. The water under pressure can be inserted through the pin assembly into the plastic material as it is being injected into the mold cavity. The water can come from a single charge, or the water, after forming the molding, can be circulated by exiting the pressurized water through a vent pin at the end of the cavity.

The use of cool water will aid in removing heat from the plastic material as it is being injected into the mold cavity and thus reduce the cycle time. Once the mold is self-supporting, the water flow can be stopped. Thereafter, gas can be introduced through the same pin assembly which will push water out of the molding. Also, a vacuum can be used to draw or remove the water from the molding system.

In a still further embodiment, sequencing of the gas pressure through the electrically controlled gas pressure valve 40 can be utilized. In this alternate process, when 95–98% by volume of the plastic material has been injected into the mold cavity, the gas pressure at gas valve 40 is held constant at its predetermined pressure. The excess gas is vented through the valve 40 as the cavity is being filled by the remaining plastic and gas is being introduced into the molding through the gas pin assembly or assemblies 30. The gas pressure at the pressure valve 40 will not exceed the predetermined pressure assembly when the cavity is filled.

The small amount of pressurized gas in the gas lines connecting the valve 40 to the mold can be vented to atmosphere.

In a further alternate embodiment, the gas sequencing can be adjusted in a different manner. After the mold is closed and the gas is pressurized to pressure P1, the gas pressure in the mold cavity 18, will equal the pressure setting on electrically controlled gas pressure valve 40. Plastic is then injected from the injection molding machine 20 through the machine nozzle 22 into the mold cavity 18. Gas in the cavity is vented through the gas pressure valve 40 so that the gas pressure in the cavity will never exceed the initial gas pressure. Thereafter, when the amount of plastic is 95–98% by volume of the prespecified amount, gas through gas pin assembly or assemblies 30 is initiated. Thereafter, gas pressure in the mold is held at the pressure P3 from the gas pin assembly 30. The remaining plastic is then introduced into the mold cavity to completely fill all of its extremities. Thereafter, when the molding is self-supporting, gas is vented through the gas pin assembly and the part is removed from the mold.

While particular embodiments of the invention have been shown and described, numerous variations and alternative embodiments Will occur to those skilled in the art. Accordingly, it is intended that the invention be limited only in terms of the appended claims.

What is claimed is:

1. A method of forming an injection molded plastic part in a mold, comprising:
    sealing the mold to prevent gas leakage from the mold cavity;
    applying an initial gas pressure in the mold cavity;
    injecting plastic material into the mold cavity;
    increasing the gas pressure in the mold cavity up to a preselected value;
    injecting gas into the plastic material after 90%–99% of the preselected amount of plastic material has entered the mold cavity;
    venting the gas from the mold cavity at a controlled rate;
    allowing the plastic material to harden forming a hollow molded article;
    venting the gas from the hollow molded article; and
    removing the completed plastic article from the mold.

2. The method of forming an injection molded plastic part as recited in claim 1 wherein the initial gas pressure is supplied from a first gas source and said injection of gas is supplied from a second gas source.

3. The method of forming an injection molded plastic part as recited in claim 2 wherein the first and second gas sources are the same.

4. The method of forming an injection molded plastic part as recited in claim 1 wherein the step of removing the completed plastic part from the mold comprises opening the mold and ejecting the part.

5. The method of forming an injection molded plastic part as recited in claim 4 wherein the part is ejected from the mold by at least one ejector pin assembly.

6. The method of forming an injection molded plastic part as recited in claim 1 wherein the gas is injected into the plastic material by at least one gas pin assembly.

7. The method of forming an injection molded plastic part as recited in claim 1 wherein the gas pressure in the mold cavity is maintained at a pre-selected value by a gas control mechanism.

8. The method of forming an injection molded plastic part as recited in claim 7 wherein said gas control mechanism is infinitely adjustable.

9. The method of forming an injection molded plastic part as recited in claim 1 further comprising the step of venting the injected gas from the plastic material before the part is removed from the mold.

10. The method of forming an injection molded plastic part as recited in claim 9 wherein the injected gas is vented through a gas pin assembly.

11. The method of forming an injection molded plastic part as recited in claim 7 wherein said gas control mechanism comprises a vent valve.

* * * * *